United States Patent

Terza et al.

[11] Patent Number: 5,556,457
[45] Date of Patent: Sep. 17, 1996

[54] RECOVERY OF STEEL PLANT REVERT MATERIALS THROUGH CEMENTITIOUS AGGLOMERATION

[75] Inventors: Raymond R. Terza, McMurray; Eugene A. Bogdan, North Huntingdon, both of Pa.

[73] Assignee: USX Corporation, Pittsburgh, Pa.

[21] Appl. No.: 426,107

[22] Filed: Apr. 21, 1995

[51] Int. Cl.⁶ .......................... C04B 18/04; C04B 18/14
[52] U.S. Cl. .................. 106/697; 106/606; 106/623; 106/624; 106/707; 106/709; 106/714; 106/717; 106/733; 106/789; 106/819; 75/318; 75/322; 75/326; 264/37; 264/145; 264/157; 264/DIG. 69
[58] Field of Search ...................... 106/707, 623, 106/606, 697, 624, 709, 714, 717, 789, 733, 819; 75/318, 316, 322, 326; 264/37, DIG. 69, 145, 157, 163, 299

[56] References Cited

U.S. PATENT DOCUMENTS

| | | | |
|---|---|---|---|
| 4,063,944 | 12/1977 | Behring | 75/322 |
| 4,961,790 | 10/1990 | Smith et al. | 106/823 |
| 5,100,464 | 3/1992 | Kelly et al. | 75/321 |
| 5,395,441 | 3/1995 | Bogdan et al. | 106/714 |

OTHER PUBLICATIONS

Holley, "Agglomeration of steel plant waste for recycling", proceedings of the 19th Biennial Conference, IBA, pp. 116–177 (Date unknown).

Primary Examiner—Mark L. Bell
Assistant Examiner—Michael Marcheschi
Attorney, Agent, or Firm—Armstrong, Westerman, Hattori, McLeland & Naughton

[57] ABSTRACT

A method of recovering steel plant waste revert materials including blast furnace flue dust and sludges involves mixing the revert materials with water to provide a total moisture content of about 14–20% by weight, then adding Portland cement as a sole binder, mixing, and, when the water content is limited to about 18 to 20%, casting the mixture onto the ground in the form of a slab or, when the water content is limited to about 14 to 16% and an accelerator for curing the cement is used, casting the mixture onto a conveyor in the form of preformed streams, curing the cast mixture and breaking it up to provide ½ inch to 5 inch agglomerate particles that can be recycled to the blast furnace.

9 Claims, 2 Drawing Sheets

RECOVERY OF STEEL PLANT REVERT MATERIALS THROUGH CEMENTITIOUS AGGLOMERATION

BACKGROUND

1. Field of the Invention

This invention relates to the recovery of iron, flux and carbon units contained in blast furnace flue dust and sludge and similar steel plant revert materials by mixing such materials with water and a cement binder, casting the mixture, crushing the material and recycling it to a blast furnace.

2. Description of Prior Art

Blast furnace and steelmaking furnace off-gases are cleaned by a dry process and a wet process (water washing), producing both dry dust and wet sludges.

Iron-, flux- and carbon-bearing waste materials ("reverts") generated in the production of iron and steel historically have been recycled back through the blast furnace after agglomeration by sintering. However, with the decreasing number of operating sinter plants, landfilling these revert materials became necessary. Steel plant flue dust and sludges were taken by truck to landfills where they were disposed of. With newly imposed landfill requirements, increasing transportation and related landfill costs, and heightened environmental awareness, a need has been created for alternative agglomeration processes to produce revert agglomerates with properties suitable for recycling back through the blast furnace. Thus, landfill costs could be decreased and valuable iron, carbon and fluxing agent units contained in the reverts could be utilized.

Early attempts at recycling steel plant by-product dusts for use in the blast furnace were directed to the forming of briquettes in a rotary-briquetting machine to form an agglomerate bonded by Portland cement, hydrated lime, and molasses. In this rotary-briquetting operation, molasses was used to provide sufficient early strength in the briquettes to permit stockpiling the agglomerates until their final strength was developed through hydration and curing of the cement. These agglomerates had adequate physical strength (ISO tumbler strength), but a lower than desired hot strength [strength after reduction under conditions simulating those present in the blast furnace, e.g. the strength index determined after testing in the U.S.Steel simulated blast furnace (SBF) test]. The use of molasses in agglomerates intended for the blast furnace adversely affected the hot strength of the agglomerates and, moreover, was later found to create environmental problems, which prompted discontinuance of this approach.

U.S. patent application Ser. No. 08/107,270 discloses recovery of blast furnace flue dust, steelmaking slag and finishing mill roll scale by agglomerating such materials with water, cement and bentonite binder in which the bentonite accounts for about 25–30% by weight of binder, and forming briquettes of such mixtures. The maximum water content for forming briquettes with useful cold strength and high temperature reduction strength is about 10%.

The sludge resulting from the wet cleaning of off-gases contains considerable water which, with the water necessary for hydration of a cement or cement/bentonite binder, often substantially exceeds 10%. Drying of the sludge is expensive and is to be avoided if possible. Moreover, the use of bentonite in such briquettes also is expensive.

SUMMARY OF THE INVENTION

As an alternative to the briquetting operation, a unique agglomeration process has been developed in which blast furnace flue dust and sludge, and optionallly other steelmaking plant waste products, such as continuous caster and hot strip mill scale, is fed to a mixer, water is added to provide a particular total moisture content, Portland cement is added and the materials mixed, after which the mixture is cast and, after curing of the cement, the solid material is broken up and recycled into the blast furnace.

DESCRIPTION OF PREFERRED EMBODIMENTS

Figure 1:
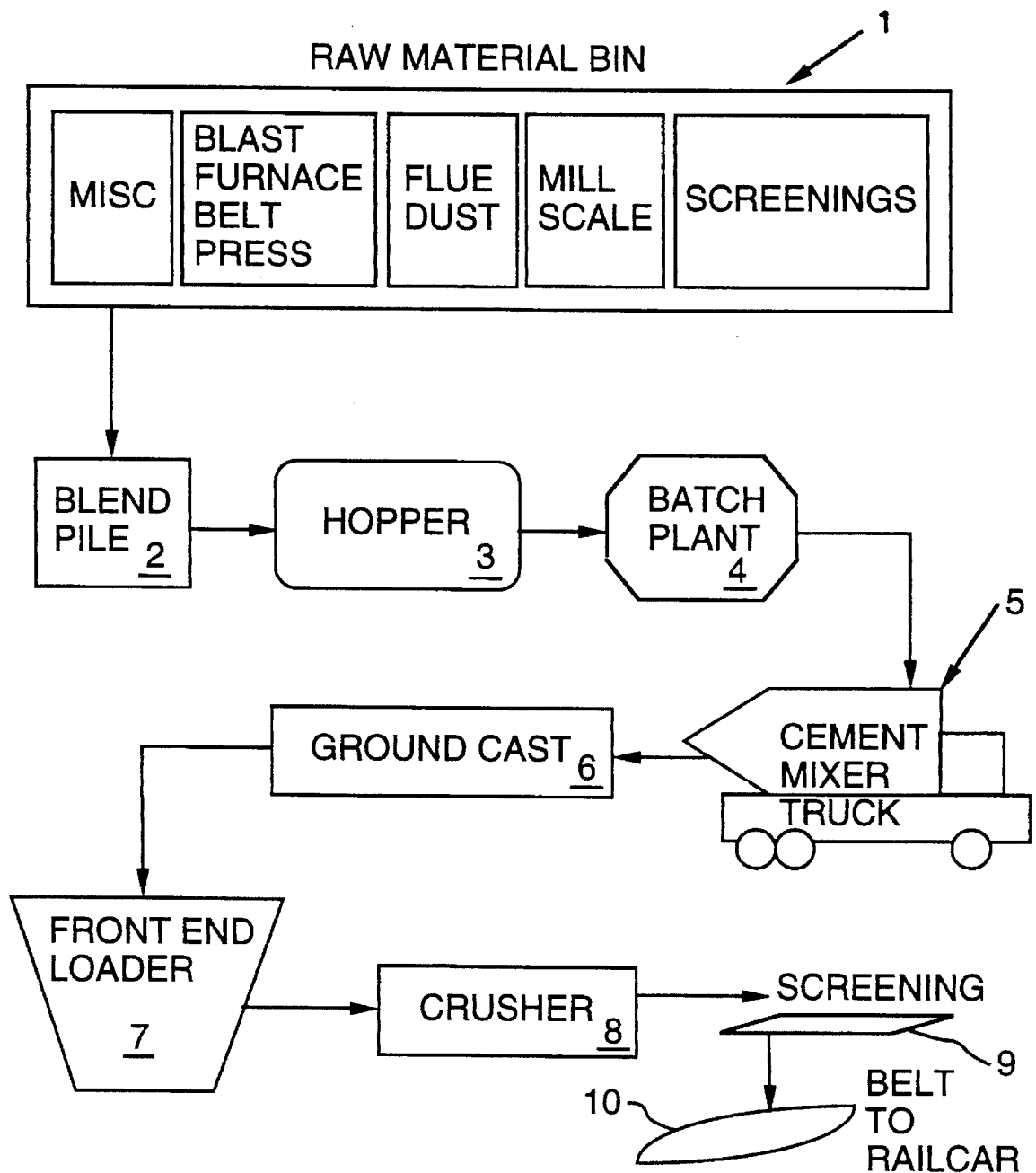
FIG. 1 is a flow sheet of a first embodiment of the process of the invention.

In FIG. 1, a raw materials bin is generally denoted by the numeral 1. Such bins may include one for screenings (minus ½ inch fines generated by crushing and screening of product), mill scale, flue dust, blast furnace belt process (sludge), and miscellaneous, e.g. basic oxygen steelmaking furnace dust or other iron or carbon bearing material. In blend pile 2 the raw materials are blended at their natural moisture content (the sludge contains about 20% by weight water) in the proportions required to achieve the desired chemical composition [i.e. iron, carbon, gangue (slag-producing constituents), and impurities content] for compatibility with the operation of the blast furnace. The blended materials then are sent to a hopper 3 and to a batch plant 4, and from there to a truck-mounted mixer 5 in which sufficient water first is added to the revert mixture to increase the total moisture content to about 17 or 18% to about 20% by weight of wet mixture. Then a measured amount of the cement binder, e.g. conventional Portland Type III cement, is added to the mixer, and the resulting mixture is mixed for about 10 minutes.

Suitable proportions of the above materials for preparing the product material are given in Table I.

TABLE I

| Material | Composition Weight Percent |
|---|---|
| blast furnace flue dust | 20 to 60 |
| blast furnace sludges | 10 to 40 |
| mill scale | 10 to 50 |
| cement binder | 10 to 15 |

Blast furnace flue dust typically consists of minus ⅛ inch particles and dust from iron ore, pellets, and coke that are blown out of the blast furnace and collected in the waste gas cleaning system. These fines consist mainly of iron, carbon and slag components. Blast furnace sludges are essentially of the same chemical composition, having been removed from the waste gases in a wet scrubber. Mill scale consists of iron, mainly as iron oxide. Other steelmaking plant waste materials, such as dust collected from steelmaking furnaces, also may be used.

The sequence of the above additions is critical in that the high moisture content of the revert mix after the water addition minimizes the formation of large agglomerates or lumps when the dry cement is added, thereby assuring a uniform mix of reverts and the cement binder.

Upon completion of mixing, the cement truck is driven to a casting site 6 where the mix is cast directly upon the ground to form a layer about 10 feet in width, 30 feet in length, and 12 inches thick. The cast material is allowed to set for 2 to 3 days to allow the hydration and hardening of the cement to take place.

The free moisture content of the cured (hardened) product generally is about 12 to 14 percent. During the curing process, some of the moisture becomes combined with the cement as water of hydration, and a small amount also is lost through evaporation from the heat released during the hydration of the cement.

The addition of the relatively high amount of water serves two purposes. It provides the mix with a somewhat fluid consistency that enhances the flow characteristics for ground casting. Also, it was discovered that, because of the ability of the sludges to retain moisture, additional water is necessary for contact with the cement binder to promote complete hydration of the cement. This complete cement hydration has been shown to result in an improvement in the high-temperature properties of the agglomerates that could not be obtained in the conventional rotary-briquetting operation. In the latter process, the moisture content of the material fed to the briquetting press is limited to about 10 percent to provide the required consistency for retention in the pockets of the briquetting press rolls, so that briquettes could be formed at high pressure.

Typical laboratory test results for the cold strength (ISO tumbler strength) and hot strength (U.S. Steel 870° C. simulated blast furnace test strength index) of the ground-cast product as compared to revert briquettes (cement/lime/molasses binder) produced in a rotary-briquetting press, are shown in Table II.

TABLE II

| Agglomerate Type | Cold Strength % +6.3 mm (+¼ in.) | Hot Strength % +6.3 mm (+¼ in.) |
| --- | --- | --- |
| Briquette | 60 | 20 to 30 |
| Ground Cast | 65 | 50 to 60 |

Cold strength is determined by tumbling a sample in a test drum using the conditions specified by the International Organization for Standardization (ISO). The tumbler strength is reported as the amount of material remaining on a 6.3 mm sieve after screening. Higher values are more desirable.

Hot strength is determined in the USS 870° C. simulated blast-furnace test. In this test, a sample is subjected to simulated blast furnace conditions (elevated temperature and reducing conditions), followed by mechanical screening or tumbling. The reduction-strength, or hot strength, index is reported as the amount of material remaining on a 6.3 mm sieve after screening. Higher values are more desirable.

Details of these tests are set out in the above-mentioned U.S. patent application Ser. No. 08/107,270, which is incorporated herein.

Upon the completion of the curing and hardening of the ground-cast material, processing is required before the material can be used in the blast furnace. The ground-cast slab can be broken and picked up using a front end loader 7 and processed through a crusher 8 to produce a product of proper size for feeding to a blast furnace, that is, a product having a top size of about 5 inches and a bottom size of about ½ inch. Several methods can be employed for the size reduction of the ground-cast material. For example, after partial curing (2 to 4 hours), the cast material can be scored to create fracture points, permitting the material to be more easily broken into pieces of 1 or 2 feet in size. These pieces then can be reduced to the desired size by the use of a sinter breaker or roll crusher 8 designed to minimize the amount of undersize (minus ½ inch) material that is returned to the blend as a recycle stream. The crushed material then is screened, as at 9, and, after screening, is loaded, e.g. by a belt conveyor 10, onto a rail car for delivery to the blast furnace stockhouse.

Figure 2:
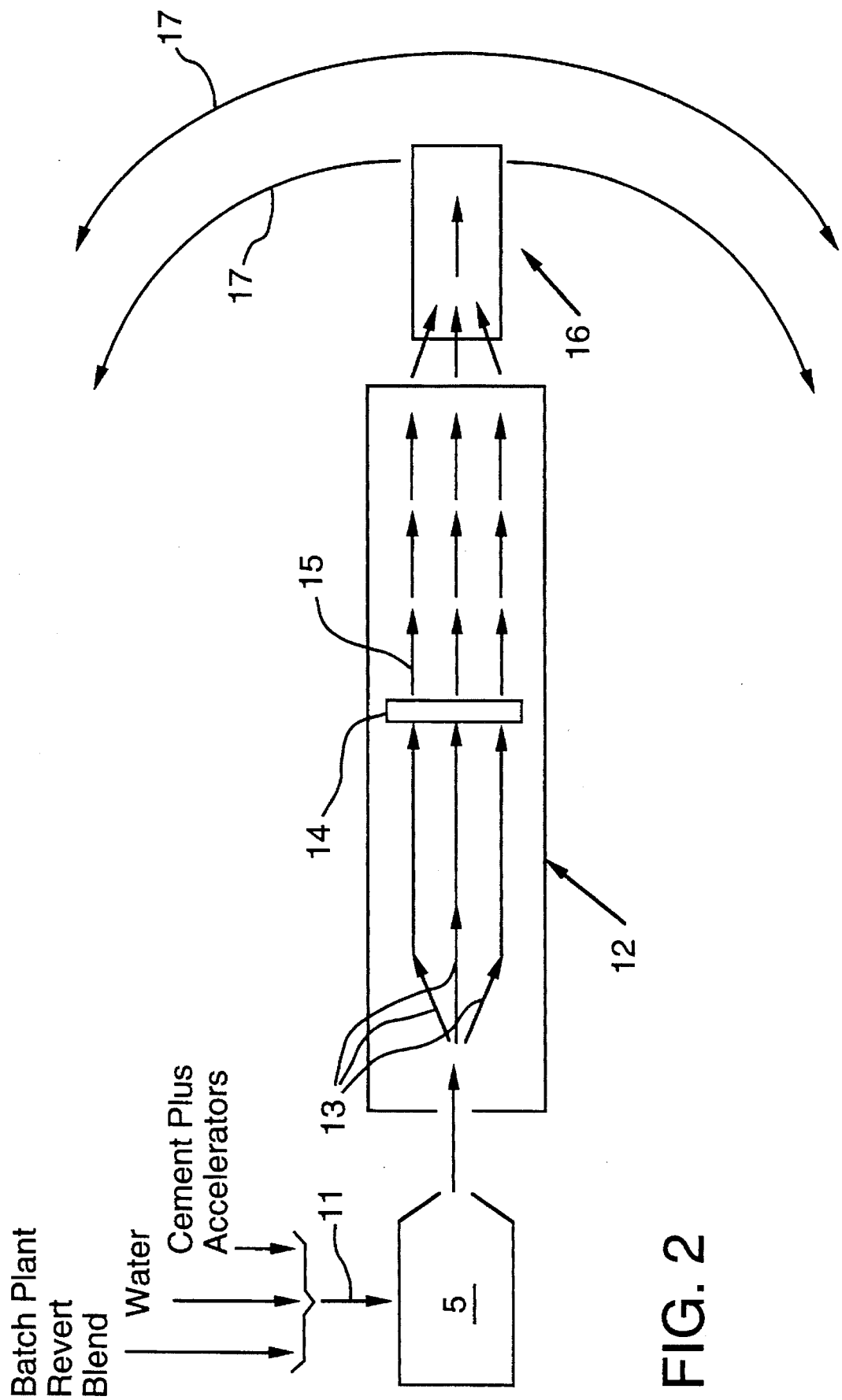
FIG. 2 is a flow sheet of a portion of an alternative embodiment of the process of the invention.

An alternative form of the process of the invention is shown in FIG. 2. This embodiment eliminates moving the cement trucks to the ground casting site, and also the ground casting step itself, and decreases the amount of breaking-up and crushing required to achieve the desired product size.

The mixing process is the same to the truck-mounted mixer 5, except for two changes which are made to the mixing step: water content is decreased slightly to a level of about 14 to 16% to provide a firmer mixture, and also accelerators, such as sodium carbonate, sodium silicate, aluminum compounds such as aluminum silicate, or calcium chloride, are added with the cement to accelerate the setting of the cement. Such accelerators can be added in an amount of about 1 to 3 percent of the mixture, replacing a portion of the cement. Thus a stream 11 of revert blend, water, cement, and accelerator is fed to the mixer 5. After sufficient mixing time, e.g. about 10 minutes, the mix is cast onto a 4 to 5 foot wide conveyor belt 12 which may be about 700 to 1000 feet long, run at a speed providing a conveyor residence time of about 10 to 15 minutes to allow the accelerators to start the hardening of the cement. The mix is separated into a plurality, e.g. three, streams 13 on the conveyor belt 12 and preformed to shapes about 12 inches wide by 12 inches high. A cutting device 14 is located at about mid-point on the conveyor belt 12 and cuts the three streams 13 to lengths of about 12 inches, resulting in shapes 15 of 12 by 12×12 inches. The shaped product streams then are transferred to a stacking conveyor 16 designed to soft load the product to ground storage for final curing of the cement. Conveyor 16 may have the capability of traversing and traveling to form multi-level arcuate windrow stockpiles 17. After 2 to 3 days in the stockpile, the cement binder in the product is cured and hardened. The product then is single stage crushed to a product aim size of minus 5 inches for use in the blast furnace. This alternative requires significantly less storage area for curing the cement, and decreases the amount of minus ½ inch fines generated in handling and crushing the product.

The iron, carbon and fluxing agents contained in the revert product replace purchased virgin materials such as iron ore pellets, coke and fluxing agents in the blast furnace burden, thus providing an associated cost benefit.

The incorporation of additional carbon into the revert mix provides a further benefit. In the blast furnace, the reducibility of an iron-bearing material (the rate at which oxygen is removed from the oxide) is affected by the ability of the reducing gas to penetrate and reach the center of the ore, pellet, or agglomerate. Therefore, the relative size of the revert agglomerates has an effect on the reducibility rate. Because the revert agglomerates have a rather large top size of about 5 inches, gaseous reduction of the iron oxide would be relatively slow in comparison with lump iron ore or pellets (top sizes of 1½ and ¾ inches, respectively), The use of blast furnace flue dust and sludge (nominally minus ⅛ inch to minus ¼ inch) in the revert mixture results in a total carbon content of about 10 to 16 percent, typically about 14 percent, carbon in the agglomerate. The fine carbon particles are in close contact with the iron oxide particles in the agglomerate, and, at temperatures of about 900° C., reduction of iron oxide by solid carbon occurs internally in the agglomerate. This "solid-phase" reduction increases the reducibility of the agglomerate over what it would be without the presence of the contained carbon, thereby negating the detrimental effect of agglomerate size on gaseous reduction. Increasing the carbon content of the agglomerate above this level could reduce the blast furnace coke requirement, for further cost savings.

What is claimed is:

1. A process for recovery of iron, carbon and flux units contained in revert materials comprising iron and steelmaking waste materials including blast furnace flue dust and sludge, said method comprising mixing the revert materials together, adding sufficient water to increase the moisture content of the revert materials to about 14 to 20 percent by weight, then adding Portland cement as a sole binder in an amount of about 10 to 15% by weight of the revert/cement mixture, mixing the wet revert materials and cement together to form a mixture, casting the mixture, curing the cast mixture to hydrate the cement thereby improving the high-temperature strength of the cast material, breaking the cast material into particles suitable for recycling into a blast furnace, and recycling the particles into a blast furnace.

2. A process according to claim 1, wherein the water content of the mixture is limited to about 17 to 20 percent by weight, and the mixture is cast onto a ground in a form of a cast slab.

3. A process according to claim 1, further comprising adding a curing accelerator selected from the group consisting of sodium carbonate, sodium silicate, calcium chloride and aluminum silicate, and the curing accelerator is added in an amount of about 1 to 3 percent by weight of the revert material/cement mixture.

4. A process according to claim 1, wherein the revert materials also comprises mill scale.

5. A process according to claim 1, wherein the revert materials also comprises steelmaking furnace flue dust and sludges.

6. A process according to claim 2, wherein the cast slab is cured for about 2 to 3 days and has a final moisture content of about 12 to 14% by weight.

7. A process according to one of claims 1, 4, and 5, wherein the water content of the revert mixture is limited to about 14 to 16 percent by weight of the wet mixture, further comprising adding to the revert mixture, water, then adding cement and at least one curing accelerator, casting the mixture onto an elongated conveyer in the form of a plurality of streams, partially hardening the stream of cast mixture while on the conveyor, cutting each partially hardened stream of cast mixture into discrete lengths, stacking the discrete lengths of cast mixture in stockpile rows, completely curing the lengths of the cast mixture in said stockpile rows, and crushing the cured lengths of cast mixture into a particle size range suitable for recycling in a blast furnace.

8. An agglomerate consisting essentially of revert materials and a single binder consisting of Portland cement, wherein the revert materials comprise, by weight percent, about 20–60% blast furnace flue dust, about 10–40% blast furnace sludges and about 10–50% mill scale, said agglomerate being produced in accordance with one of claims 1–3 and 5–7.

9. An agglomerate consisting essentially of revert materials and a single binder consisting of Portland cement, said agglomerate being produced in accordance with claim 4, wherein the revert materials comprise, by weight percent, about 20–60% blast furnace flue dust, about 10–40% blast furnace sludges and about 10–50% mill scale.

* * * * *